(12) United States Patent  
Bruno

(10) Patent No.: US 9,108,768 B2  
(45) Date of Patent: Aug. 18, 2015

(54) HAND-HELD CLEANING APPARATUS

(71) Applicant: FILMOP S.R.L., Villa del Conte (IT)

(72) Inventor: Zorzo Bruno, Villa del Conte (IT)

(73) Assignee: FILMOP S.R.L., Villa del Conte (PD) (IT)

( * ) Notice: Subject to any disclaimer, the term of this patent is extended or adjusted under 35 U.S.C. 154(b) by 0 days.

(21) Appl. No.: 14/017,068

(22) Filed: Sep. 3, 2013

(65) Prior Publication Data

US 2014/0061214 A1 Mar. 6, 2014

(30) Foreign Application Priority Data

Sep. 4, 2012 (IT) .............................. PD2012A0255

(51) Int. Cl.
*B65D 25/28* (2006.01)
*A47J 47/18* (2006.01)
*A47L 13/51* (2006.01)

(52) U.S. Cl.
CPC ............. *B65D 25/2867* (2013.01); *A47J 47/18* (2013.01); *A47L 13/51* (2013.01)

(58) Field of Classification Search
CPC ...... A47J 47/18; B65D 25/2867; A47L 13/51
USPC ................. 220/773, 772, 756, 755, 762, 763; 215/397, 396; 15/257.7, 268; 248/145.6, 110; 211/65
See application file for complete search history.

(56) References Cited

U.S. PATENT DOCUMENTS

| | | | | |
|---|---|---|---|---|
| 545,434 | A * | 8/1895 | Wiles et al. .................... | 220/755 |
| 694,807 | A * | 3/1902 | Vanderburg ................... | 222/466 |
| 1,411,336 | A * | 4/1922 | Franklin ........................ | 222/572 |
| 2,584,219 | A * | 2/1952 | Murrell ......................... | 312/207 |
| 4,023,702 | A * | 5/1977 | McKnight ..................... | 220/756 |
| 4,947,998 | A | 8/1990 | Smeller | |
| 5,097,965 | A * | 3/1992 | Fehr ................................ | 211/65 |
| 5,337,910 | A * | 8/1994 | Picozza et al. .............. | 220/367.1 |
| 5,715,968 | A * | 2/1998 | Fink et al. ..................... | 220/669 |
| 7,984,820 | B2 * | 7/2011 | Dancyger ...................... | 220/532 |

* cited by examiner

*Primary Examiner* — Fenn Mathew
*Assistant Examiner* — Don M Anderson
(74) *Attorney, Agent, or Firm* — QuickPatents; Kevin Prince

(57) ABSTRACT

The invention concerns a pair of handles of a cleaning bucket configured and/or shaped in such a way as to make the bucket extremely practical and handy, allowing it to contain/retain in the space between them the protruding handle of a cleaning implement housed in the underlying container.

12 Claims, 6 Drawing Sheets

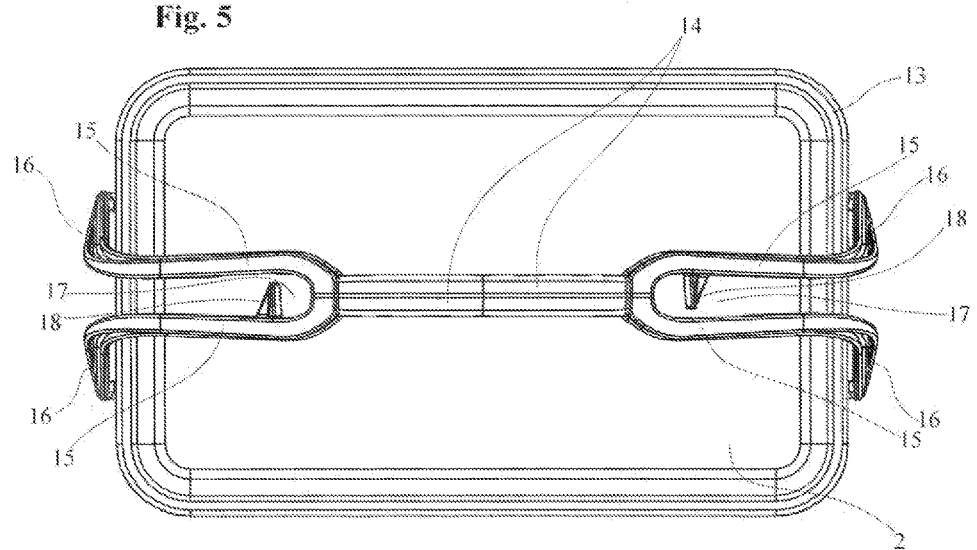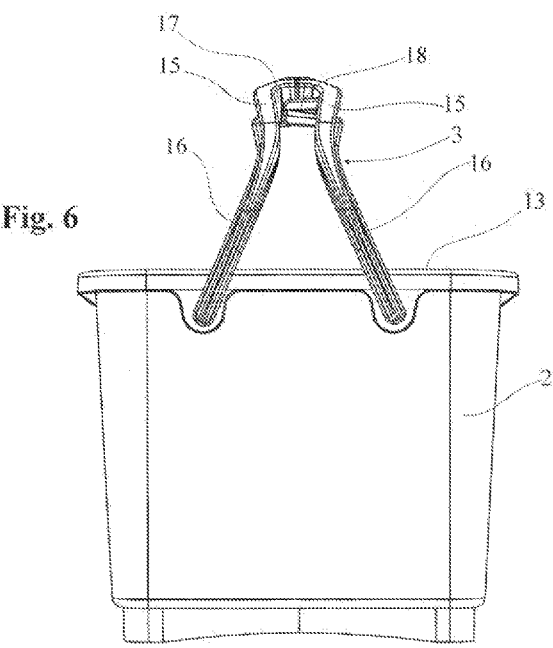

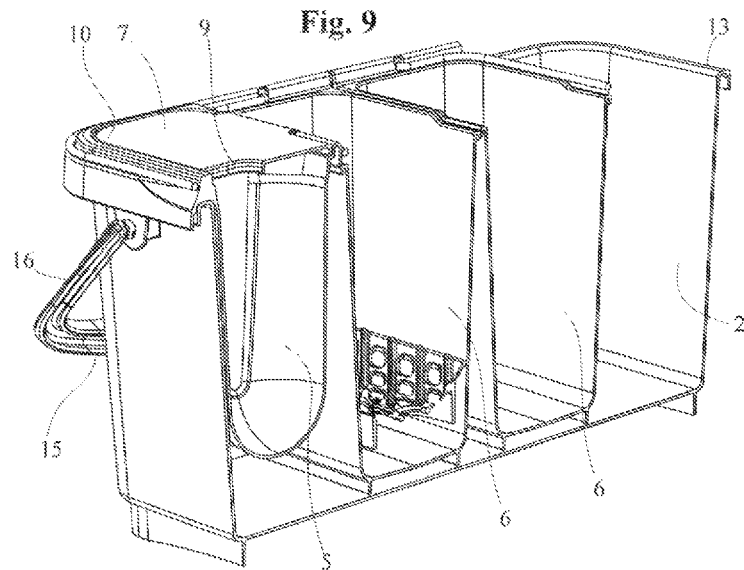
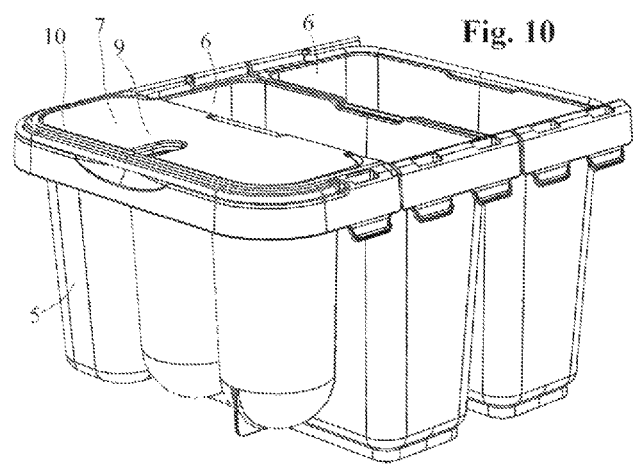
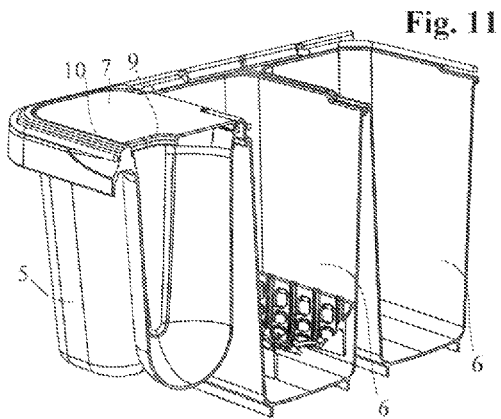

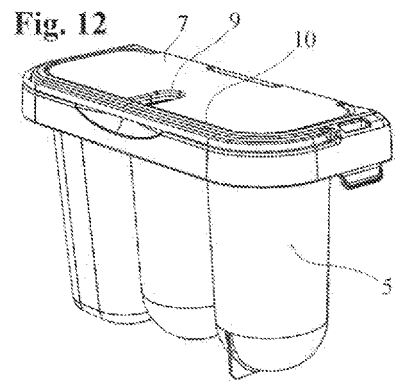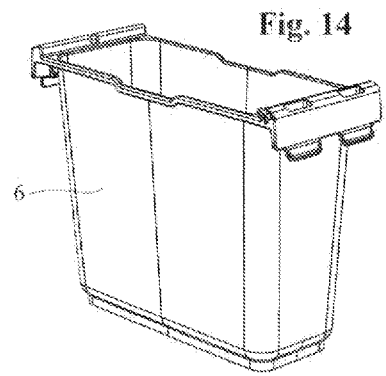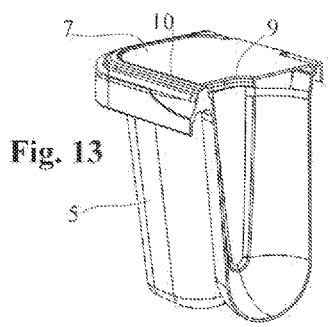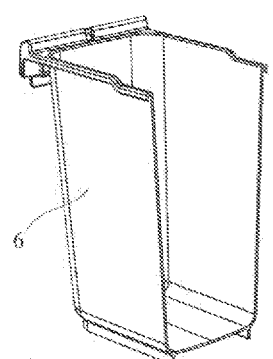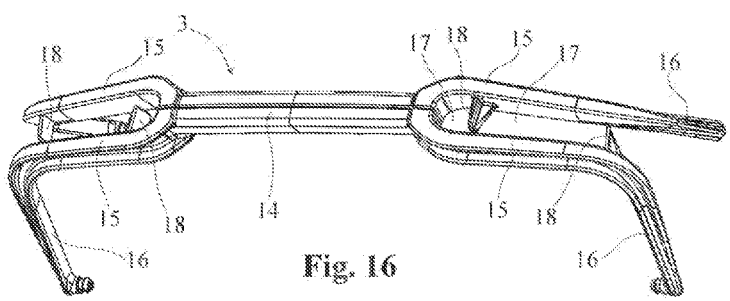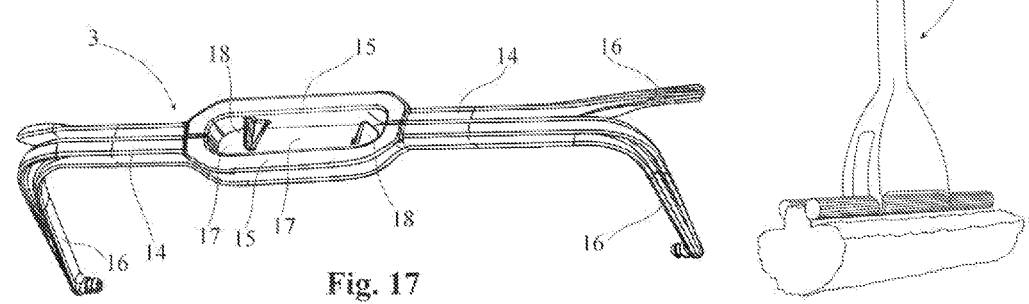

HAND-HELD CLEANING APPARATUS

CROSS-REFERENCE TO RELATED APPLICATIONS

This application claims the benefit of Italian Patent Application PD2012A255, filed on Sep. 4, 2012, and incorporated herein by reference.

STATEMENT REGARDING FEDERALLY SPONSORED RESEARCH AND DEVELOPMENT

Not Applicable.

FIELD OF THE INVENTION

This invention concerns handles of a cleaning bucket configured and/or shaped in such a way as to provide the bucket with substantial practicality and ease of use.

DISCUSSION OF RELATED ART

Buckets are some of the most versatile and indispensable instruments in the cleaning sector.

In fact, they have both an active and passive dual function, namely to contain the liquid or other cleaning implements, and also to be transported from one place to another according to requirements.

For this reason, their shape very often takes on forms that seek to respond to precise cleaning requirements.

There are numerous circumstances that influence their shape and their accessories; they may or may not have wheels under the lower surface or else compartments inside their basins.

Something that is practically indispensable for using them is the handles for transporting and moving them.

Therefore it is clear that the operator selects and acquires a bucket with handles mainly on the basis of how it will be used, with particular reference to the requirements it may face.

However, very often, because there is nothing on the market that has been specifically designed for a specific use, he/she has to make do with using a generic bucket, with all the drawbacks that entails.

In particular uses, determined by limited sizes and/or space for movement, a bucket would be necessary that can be easily transported together with the various cleaning equipment needed for the various operations to be carried out.

Very often the same bucket is used for transporting a substantial quantity of liquid detergent and/or rinse water for cleaning floors and/or surfaces, to prolong the autonomy of the cleaning operations.

Naturally, what is said above is in contrast with the easy and simple moving of the bucket itself.

If said bucket also has to be moved both by hand and also along the floor, it is clear there are problems resulting from the distinct requirements.

Now in particular cleaning sectors, like that for public transport, where space is tight, we can sense that the problems get bigger.

For example trains, trams, underground trains, buses, etc.

Now both the cleaning of the means of transport as well as the practicality of having a cleaning tool where the size is quite small requires a suitable bucket with handles.

Today there is no bucket where these features, both regarding the cleaning of such means of transport as well as regards the size of the bucket itself, complete with relative equipment, are sufficiently taken into consideration.

In fact, very often the operator has a normal bucket with none or more handles and a generic one, but with various equipment, which when required is inserted in the relative bucket to rinse or dampen or just generally clean.

When being moved, which can take place also in narrow and/or tight spaces, like crowded public places, inside a transport vehicle, for example trains, buses, trams, ships, airplanes, etc., the operator generally grips the handles of the bucket with one hand, and with the other holds the cumbersome equipment. In fact, very often among the cleaning equipment there are necessarily equipment whose handle is quite long (brushes, sweeps, washing sponges, etc.) and bulky.

This way that the operator moves around, holding the bucket with one hand and gripping the equipment in the other, makes it practically compulsory to avoid equipment with a long unwieldy handle getting slanted with the danger of hitting someone.

The same requirement of a bucket full of equipment, whose total size is anyway limited, is felt also when the bucket, with the relative equipment resting inside, is left, at the end of the cleaning operations, inside a storage room or dropped off in an area set aside for such purposes.

The same requirement described above is equally felt for cleaning that has to be carried out during the journey with the transport vehicle, like a train, which is moving and when the general public is also around.

As we said, nothing has been specifically designed for this purpose.

Generally a professional operator of a cleaning company always has various tools at hand for all kinds of cleaning, and currently operators think up quite banal expedients, which prove to be unsatisfactory in any event, for limiting the dimension of the bucket itself, which is sometimes full of equipment when being used.

We should bear in mind that almost always the above-mentioned equipment needs to satisfy the requirement of cleaning floors, and also very often other surfaces, like for example small tables, eventual armrests or glazed or windowed surfaces, and also very often, the cleaning of a bathroom if there is one present.

Therefore it is clear that there is a strong need in the sector for the simultaneous presence of varied professional cleaning equipment that can meet all the requirements mentioned.

SUMMARY OF THE INVENTION

One of the main aims of this invention concerns the overcoming of the drawbacks of the prior art, which present themselves with the adoption of normal and standard cleaning tools and equipment.

A further main aim of this invention is to make available a specific tool for cleaning areas where space, during cleaning and/or during the period when it is not being used, is limited.

Another object of this invention is to make available handles for a cleaning bucket that help the operator move the bucket, making it easy to transport.

A further object of this invention is to make available handles for a cleaning bucket arranged in such a way as to favor its transportation with or without the detergent solution and/or cleaning water in the bucket.

An even further object of this invention is to make available handles for a cleaning bucket whose transportation is secure also when there are liquids in housings and/or open compartments of the container of the bucket.

A further aim of this invention is to make available handles for a cleaning bucket which can hold in a secure position the handles protruding from the cleaning equipment inside the container.

A further object of this invention is to make available handles for a cleaning bucket which do not interfere when being used and/or being moved with said protruding handles of the equipment in the container.

An even further object of this invention is to make available handles for a cleaning bucket which make it easier to move said bucket in the floor.

Another object of this invention is to make available handles for a cleaning bucket capable of keeping in order the cleaning equipment in suitable compartments and whose handles protrude.

Another object of this invention is to make available handles for a cleaning bucket capable of distinct and separate the cleaning equipment in suitable compartments and whose handles protrude.

Another object of this invention is to make available handles for a cleaning bucket capable of helping the operator identify the correct position of the cleaning equipment held in suitable compartments and whose handles protrude.

PRESENTATION OF THE INVENTION

Solutions to the Problems and Objectives

All the above-mentioned requirements are met with a pair of handles for a cleaning bucket, hinged at its top edges, or near them, by an opposite pair of sides of the container of said bucket, whose hinging and rotation axes are slightly offset with respect to the center line, and because said pair of handles can take on a first rest or lowered position, with the central part of the handles next to the side walls of the container and capable of taking on, after a partial rotation around its hinging axis, a second raised position in a reciprocal union, whose particular feature is the fact that at least one of said handles is specially configured and/or shaped and/or profiled in such a way that said raised position of both of them can contain and/or maintain and/or hold between them a handle of a cleaning implement contained in the underlying container and whose handle protrudes upwards beyond the height of said handles.

For simplicity's sake, hereafter said segment able to contain and/or maintain and/or hold the handle of a cleaning implement will be called a containment segment.

Beneficially, in a first variant said containment segment is central with respect to the extension of the handle, flanked at the end by a pair of segments joined between the handles to form a pair of elements suitable for being gripped, called a grip, and in a second variant said containment segment is arranged to continue on the side, on at least one side, of a grip section arranged centrally, with respect to the extension of the handle.

Beneficial Characteristics of the Invention

Beneficially, according to at least one of the above-mentioned variants, at least one of said containment segments can be configured as a space between the respective facing segments and distanced from each handle and suitable for the passage through it of at least a handle of a piece of manual equipment inside said container.

Beneficially, according to at least one of the above-mentioned variants, at least one of said containment segments can be configured as the continuation in alignment or slightly inclined of the central part or side part of the grip, at least for one of the handles, and for at least one side adjacent to the grip, which diverges with respect to the center line of the container and/or leaves a space, suitable for containing/holding at least one handle of an implement inside the underlying container.

Beneficially, the bucket of this invention is made up of a container, preferably rectangular, with the longitudinal side longer than the crosswise one, and equipped with a pair of handles, proving to be more suitable for transportation and handling with just one hand.

A further benefit lies in the fact that the handles are a pair of shaped long-limbed elements hinged near the top edge of said container, making the bucket much more stable when being transported.

Another benefit is obtained from having placed the hinging axes of said handles parallel, shifted and spaced with respect to the longitudinal horizontal axis of the center line of the container, thereby making transportation easy also when there is a liquid in the container.

These handles have a pair of stable positions, a first lowered position with the center of the handle near the outside of the longitudinal wall of the container and a second raised position.

These handles rise up into said raised position after a partial rotation of the lowered rest position, above the container, making a holding area available at the center, said gripping section. In said second raised position, the central parts of the pair of handles are joined together, preferably joining only in the central part of the container, forming a suitable grip for transporting the bucket.

Beneficially, the shape and/or curve of at least one handle continues, with respect to the gripping section with a holding/containing segment, defined as a containment segment, which has practically the same position, and one with a slight inclination, of the gripping section, but with respect to this latter is distanced from the corresponding overlooking part of the handle opposite, leaving a space.

Eventually, the containment segments are just shaped with spaces suitable for implements contained in the bucket and protruding to a height beyond the height of the handles when in their raised position.

Therefore said containment segments connect with their end opposite the grip, with the raised part of the handles, whose end is hinged near the top edge of the container.

Beneficially, inside the space left between at least one containment segment with respective part of the opposite handle, can receive and contain on the side the handle of a cleaning implement contained inside the underlying container, in the event one or more handles protrude upwards beyond the height of the handles of the bucket.

This lateral containment inside the space created by the containment segments prevents the movement of the handles contained inside the space itself in an orthogonal direction to the handles themselves.

A further advantage is obtained by providing said handles, in particular at the ends or in the intermediate zones of said containment segments, with one or more elements that protrude perpendicularly to the handles, for interrupting and/or dividing said space for holding the handles, with the aim of preventing, or limiting, any movement either longitudinal or transversal, i.e. so as to prevent, or limit, the handle of the cleaning implement from moving in the two directions along the handles and perpendicularly to them.

Evidently said partitioned spaces present in the containment segment of the handle itself can be derived from the same profiling of the handles.

Eventually the retention space in the containment segment of the handles can be tapered towards the raised parts of the handles themselves, ideally configured as a triangular or trapezoidal shape with the top or the lower base positioned near the raised section of the handles themselves, succeeding therefore in retaining, opportunely spaced, the handles with various diameters of the cleaning implements contained in the bucket.

In a modified version to the one described previously, said handles above the container join laterally in a pair of gripping sections, spaced or with a space interposed that is suitable for the passage through it of at least one handle of a manual cleaning implement contained in the container.

The curvature and/or the profile of at least one containment segment of the handles, to realize the central space at the top of the container, is sufficient for the containment/retention of the handle of a manual cleaning implement inside the container; said space, however, can have various cross-sections, starting from a minimum one, in practice corresponding to the cross-section of a handle to be held, to an authentic window capable of retaining and containing, eventually spaced with one of more partition elements perpendicular to the handles, also two or more handles of cleaning implements.

It is clear that said pair of handles with the configuration and shape set out above, helps the operator in transporting inside a small bucket also the equipment needed for different types of cleaning, whose handle protrudes above the height of the handles when they are raised.

In particular, beneficially said handles are contained in by the spaces interposed or present between the bucket handles, without exceeding the perimeter profile of the container.

This advantageous characteristic proves useful when transporting the bucket, avoiding accidentally hitting people along the way, and useful when repositioning after work, for example in a storage area or cupboard, with the bucket full of implements, without wasting space and without the relative protruding handles dirtying or scratching the surfaces of the surrounding walls.

Beneficially the container of the bucket has one or more modular compartments at the ends or located centrally, capable of keeping divided and separate the equipment, the devices, the washing water and/or detergent solutions to be used for cleaning.

Advantageously with said containers, which can be easily removed, but which can be solidly secured to the container, the objective of being able to keep separate and distinct the various cleaning tools, and in particular the cleaning equipment, is attained.

The above-mentioned advantageous characteristic is maintained and confirmed by the formulation of the retention spaces on at least one handle in line with the underlying compartments, maintaining/keeping the relative handles of the equipment separate in said compartments.

At least one of these compartments, moreover, has a cover, advantageously hinged along the edge of the compartment itself, in such a way as to keep sufficiently compartmentalized for odors or also for keeping the content out of sight of the public.

Beneficially said cover, for closing at least one of the compartments, has an aperture that can be closed, but letting a handle of a cleaning tool inside the compartment come out.

Preferably said aperture is located in the middle of the cover and configured orthogonally to the hinging axis of the cover itself on the opposite edge.

Very conveniently said compartment can be used for cleaning bathrooms, in particular toilets, with the relative equipment being a bathroom brush.

In this case, the compartment that can be closed with a cover with an aperture, can be further divided inside for specific uses, or shaped with partitions for cleaning the brush, holding a liquid detergent and having another compartment for sponges and/or cleaning cloths exclusively for the toilet.

Further basin compartments can be used for the cleaning of floors and other surfaces (such as tables for the public, or handles or glass and the like).

In fact, as is well known, the surface of a floor is always very dirty and needs, to provide a minimum quality, to be cleaned using two containers, one with dirty water and the other with the clean detergent.

The container that can be accessorized with modular basin compartments allows you to divide the overall space inside and this is also a benefit for cleaning floors.

A basin compartment will be used to hold the dirty liquid from the floor, while another compartment, preferably the one next to it, could be used for containing the clean liquid detergent.

A manual instrument, like sponges with roller wringer, positioned at the end of a handle, an example of which in the past was defined as a "cleaning sponge", are tools that are suitable for being combined with this equipment, entering into the above-mentioned basins easily, having a dimension that corresponds to the cross-section of the entry mouth of said compartments.

Finally, said container can be completed with another compartment for all other cleaning, in addition to that for the toilet and floors, this latter needing at least two modular compartments.

Evidently with this further compartment separated from the others, to be used for various cleaning purposes, all the cleaning accessories could go here, like cloths, sponges, detergents and/or disinfectants, dosers, useful for carrying out all the probable general cleaning operations.

In this way the aim of making available a pair of handles for cleaning buckets is attained, which are easy to use also with equipment whose handles exceed the height of the buckets raised handles.

In particular, the containment/retention of these bucket handles, which is the object of the invention, in the raised position, allows you to meet all the above-mentioned objectives.

However, such a bucket would only be useful for transporting by hand, namely moved only after being lifted manually by holding the relative grip.

Said bucket with wheels on its base could also be moved easily having it slide on said wheels.

Even though this might be useful for small distances, it would not be suitable for long distances, because of the handle grip not being sufficiently high.

To this end, therefore, it could be useful to have available the handle of one of the manual cleaning implements that protrude beyond the height of the bucket's handle grip, with said implement handle held in the space between the containment section of the above-mentioned bucket handles, so as to be able to push a wheeled bucket as required, also for long distances, like the passageways and/or transit areas between rows of seats or from one compartment to another.

DESCRIPTION OF THE DRAWINGS

The technical characteristics of the invention, in line with the above-mentioned objectives, can clearly be found in the claims below and the benefits will be even clearer in the detailed description that follows, made with reference to the attached diagrams, which represent a form that is purely by way of an example, and in no way restrictive, where:

FIGS. 4, 5 and 6 show the handles of the invention applied to a cleaning bucket respectively from a side plane view of the longitudinal side, a plane view from above, and a side plane view of the transversal side;

FIG. 9 shows FIG. 7 in a cross-section along a vertical plane passing through the axis of the center line of the bucket;

FIG. 10 shows the modular end compartments or intermediate that can accessorize the container;

FIG. 11 shows a cross-section of FIG. 10 along the same vertical plane of FIG. 9;

FIGS. 12 and 13 show a prospective view and a cross-section view of an end compartment FIGS. 14 and 15 show a perspective view and a cross-section view of an intermediate compartment;

FIG. 16 shows a prospective view of the handles of the invention of a preferred realization, where the gripping zone is in the center of the handles and the containment spaces are on the side next to the gripping zone;

FIG. 17 shows a perspective view of the handles of the invention of a preferred second realization, where the containment space is in the center of the handles and the gripping zones are on the side next to the containment segments;

FIG. 18 shows an example of a cleaning implement, called a cleaning sponge, which can be inserted in the container of the bucket and has a long handle protruding beyond the height of the raised handles, which hold it inside the spaces created by the containment segments of the handles.

DETAILED DESCRIPTION OF THE PREFERRED EMBODIMENT

Figure 1:
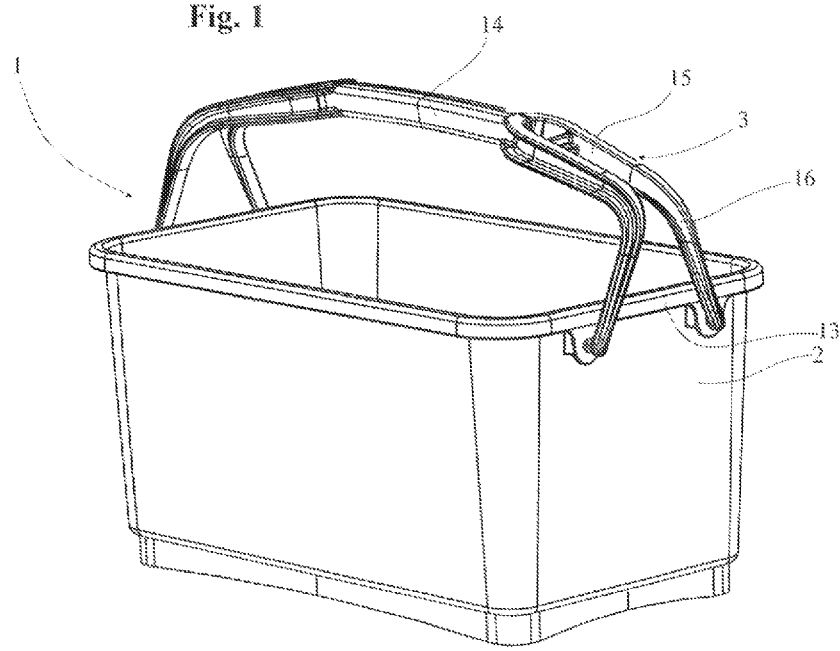
FIGS. 1, 2 and 3 show the handles of the invention applied to a cleaning bucket from various overhead views.
Figure 2:
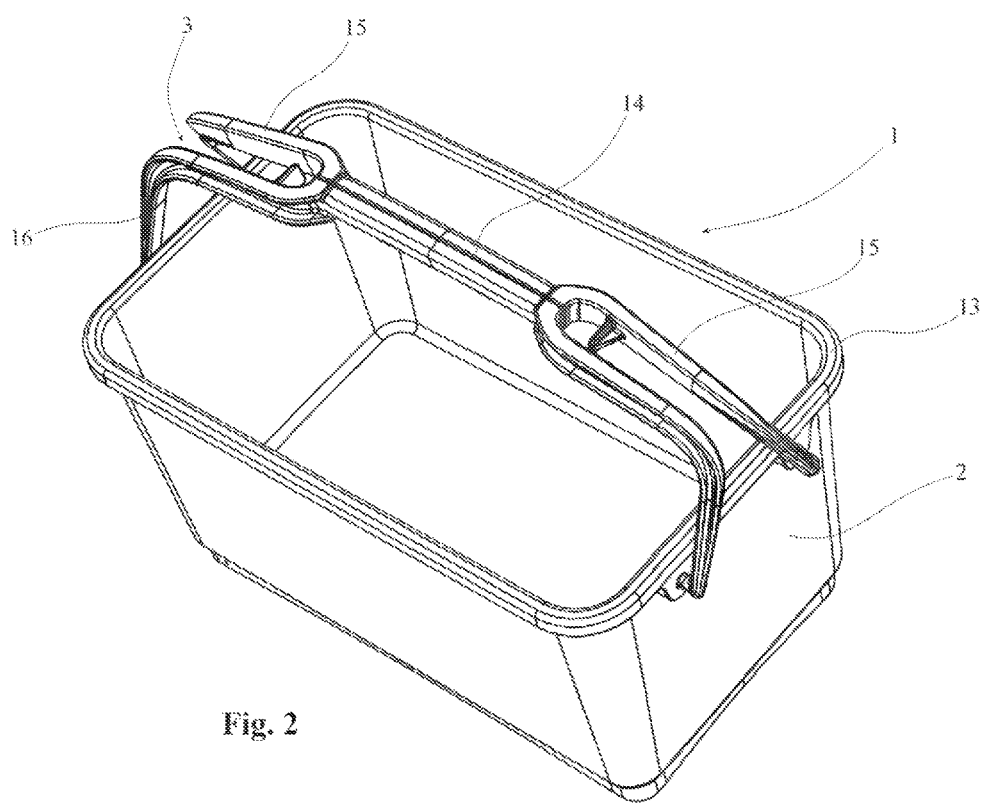
Figure 3:
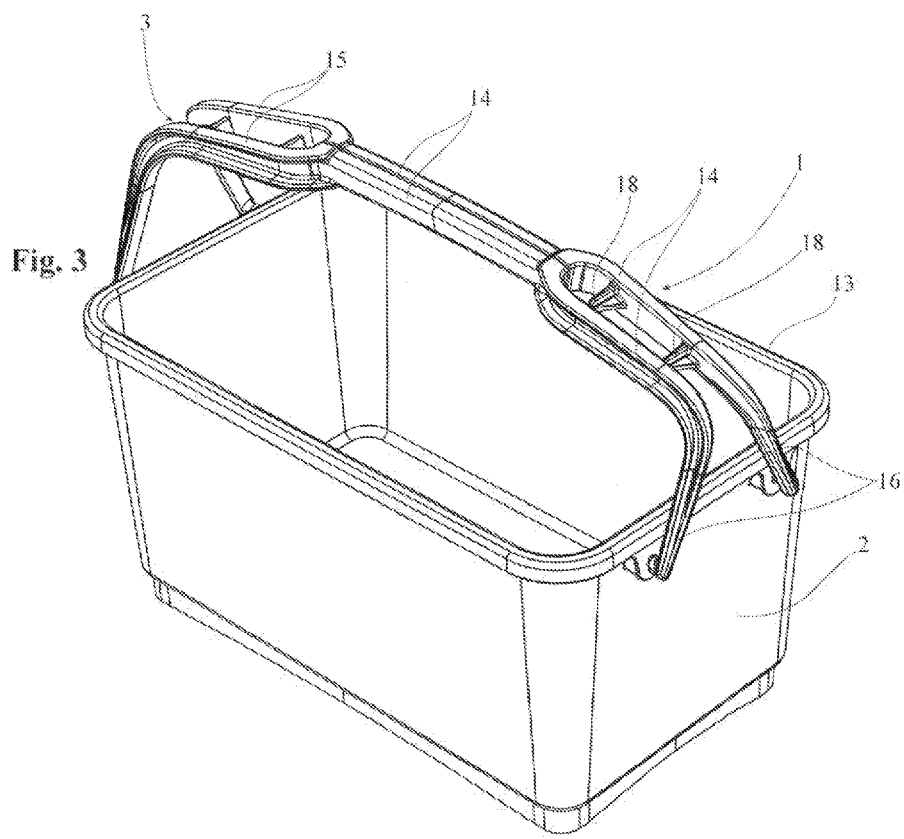
Figure 4:
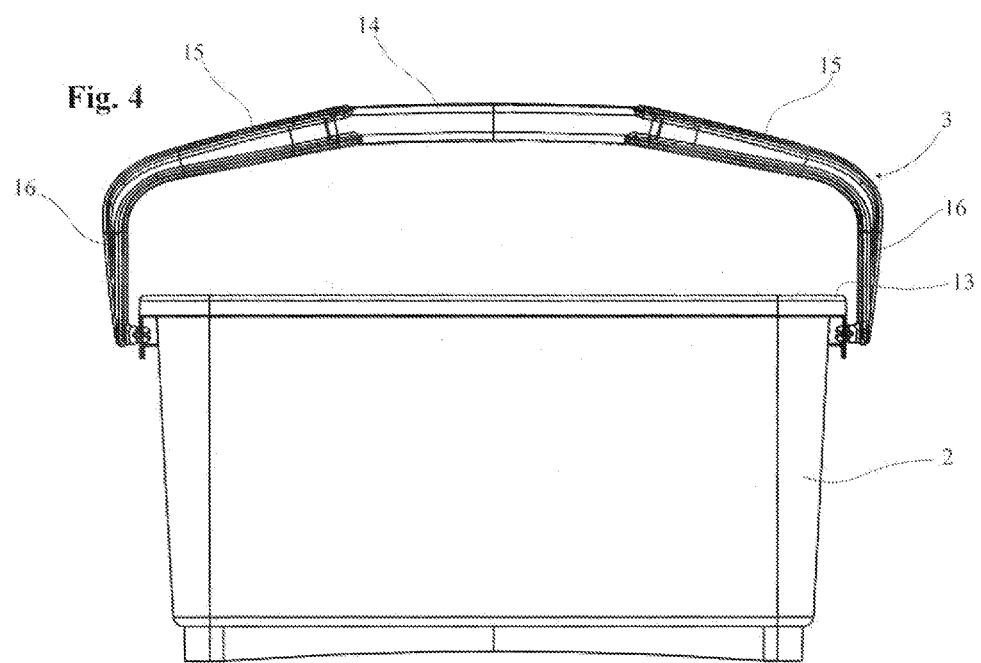
Figure 7:
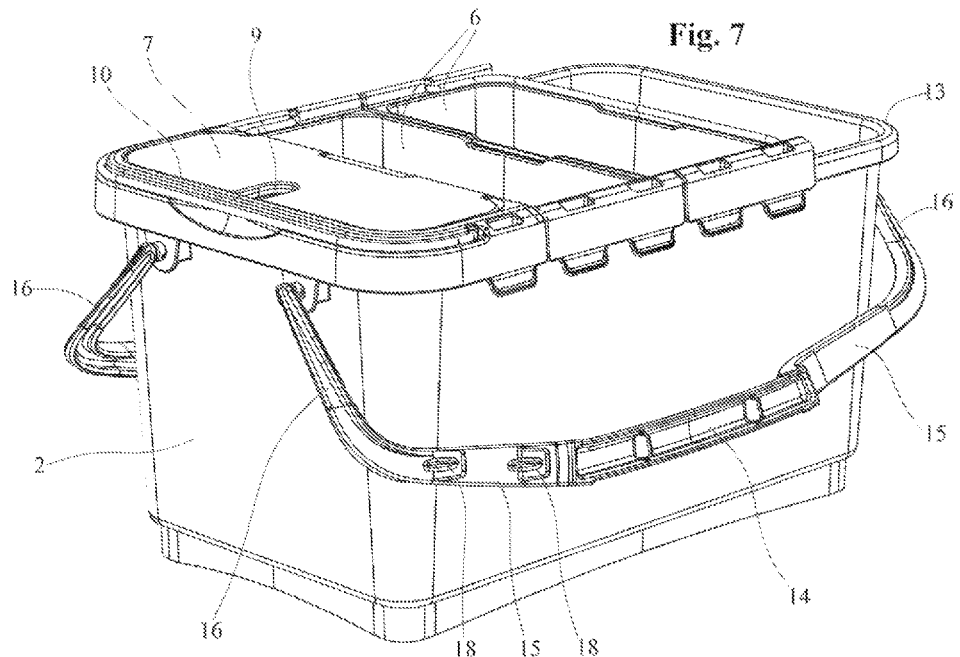
FIG. 7 show the handles of the invention applied to a cleaning bucket from a prospective view at rest or lowered, with the central part lying adjacent to the side walls of the container accessorized with compartments.
Figure 8:
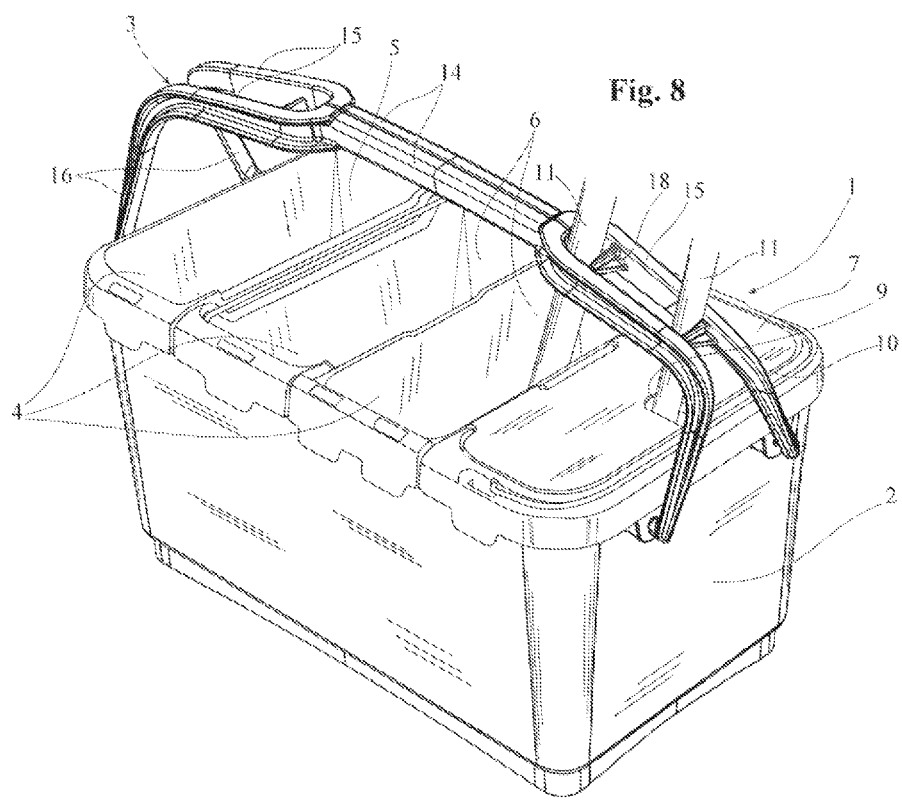
FIG. 8 shows a prospective view of the bucket handles of the invention applied to a cleaning bucket in a raised position joined to one another, containing in the spaces between them the handles of cleaning implements protruding above the height of the handles and contained inside the container.

Below is an example of the handles of the invention applied to a cleaning bucket in accordance with the diagrams.

The bucket is composed essentially of a container 2 and a pair of handles 3.

Beneficially said bucket 1 can be accessorized with a series of compartments 4 inside the volume of the container 2.

These basket compartments are modular elements at the end 5 or in an intermediate position 6.

Some of these compartments 4 can have a hinged cover 7 and/or interior partitions for creating further compartments 8, as seen in FIG. 12.

One of these covers 7 has an slit 9 in the middle up to the edge that is not hinged 10 so that it can close on the mouth of the relative compartment 5 also when there is a handle 11 of a manual cleaning implement 12 inside said compartment 5, with said handle 11 protruding out of the cover 7.

As was said, the particularity of this bucket 1 lies in the configuration of the pair of handles 3.

These handles 3 are configured, eventually, but not essentially, in a mirror-like and/r symmetrical manner, as a pair of particularly shaped long-limbed elements.

These handles 3, moreover, are hinged near the top edge 13 of the container 2.

Beneficially the hinging edge is the transversal wall of the container.

The hinging axis of the handles 3 is parallel to the longitudinal horizontal axis and sufficiently lateral and offset with respect the center line of the container 2, so as to provide the bucket with good stability when being transported using said handles 3.

These handles 3 are composed ideally of several sections: a first lateral end section, or raised section 16, a central section or grip 14 and an intermediate section between the raised section 16 and the grip 14 defined a containment section 15, as clearly seen in the diagram of FIG. 16.

The raised section 16 of the handles 3 is the one practically parallel to the orthogonal side and that distances the grip 14 of the handle 3 of the container 2.

The grip 14 is the central section of the handles 3 to be used as a grip for transporting the bucket 1; it is a pair of sections of both handles that join together.

The containment segment 15 is the section of the handle 3 that connects on the one side the grip 14 and on the other the raised section 16.

At this section 15, on its inner side, there is a free space 17, with respect to the section itself of the handle 3 opposite. This free space 17 can be due either to the curvature of the containment segment 15 itself or because of its configuration.

The function of this free space 17 along the containment segment 15 is to contain the handle 11 of a manual cleaning implement 12 housed inside the container 2 of the bucket 1 and whose handle 11 protrudes above the height of the handles 3 when these are raised above the container 2.

In particular, inside this free space 17 a handle 11 is kept restrained against transversal movements.

By accessorizing the inner side of the containment segment 15 with one or more orthogonal protruding elements, and handle is kept firm and restrained against any longitudinal movements.

A second preferred embodiment of the handles is shown in FIG. 17. In this variant, the space 17 between the containment segments 15 is arranged centrally along the extension of the handles 3, while the gripping sections 14 are set alongside said containment segments 15.

Evidently the handles 13 are too short to be gripped, making the bucket slide along the floor on its wheels. However, according to the invention the handle 11 of a cleaning implement 12 is available at a higher height than the grip 14 of the handles 13.

This handle 11 of a cleaning implement can be used, being held stably in the space 17 made by the containment segment 15 as a grip for moving and steering the bucket 1 with wheels on the bottom.

The invention conceived and configured in this manner attains the pre-set objectives.

Obviously it can take on, in its practical realization, also forms and configurations different from that set out above, without leaving this ambit of protection.

Moreover, all the parts can be replaced by technically equivalent elements and the sizes, shapes and materials used will be those that are required.

The invention claimed is:

1. A pair of handles for a substantially rectilinear cleaning bucket, the handles each hinged proximate to and there between opposing top edges of the bucket, each handle having a top portion with lineal extent between the top edges and a rotational axis offset with respect to a center line of the bucket, the pair of handles positionable between a lowered position, wherein the top portion of each handle rests against a side wall of the bucket, and a raised position, wherein the top portion of each handle meets in abutting engagement to form a containment segment shaped for mutually holding a handle of a piece of cleaning equipment when centrally positioned with respect to a span of the handle, the containment segment flanked at at least one end by a collinear gripping segment suitable for being manually grasped when the handles are in the raised position such that when the piece of cleaning equipment is contained in the bucket below the handles, the cleaning equipment handle protrudes upwards above the handles.

2. The pair of handles for a cleaning bucket according to claim 1 wherein the containment segment is flanked at both ends by a pair of gripping segments.

3. The pair of handles for a cleaning bucket according to claim 1 wherein each handle is a mirror image of the other handle.

4. The pair of handles for a cleaning bucket according to claim 1 wherein a space defined between said handles when in the raised position has a shape that is complementary to the handle of the cleaning equipment to be retained.

5. The pair of handles for a cleaning bucket according to claim 1 wherein a space defined between said handles when in the raised position is divided by at least one protruding element that is substantially perpendicular to each handle.

6. The pair of handles for a cleaning bucket according to claim 1 further including a plurality of wheels fixed with a bottom of the bucket, whereby the handle of the cleaning equipment when retained between the pair of handles is moved to move the bucket.

7. The pair of handles for a cleaning bucket according to claim 1 wherein the handle of the cleaning equipment when retained between the pair of handles is contained inside the perimeter profile of the bucket.

8. The pair of handles for a cleaning bucket according to claim 1 wherein the bucket includes a plurality of containers that each define a modular compartment, each compartment being located at an end or in an intermediate position within the bucket.

9. The pair of handles for a cleaning bucket according to claim 8, wherein a containment segment of each handle shaped for holding the handle of the cleaning equipment is positioned above each compartment when the handles are in the raised position.

10. The pair of handles for a cleaning bucket according to claim 8 wherein at least one of said containers has a cover hingedly connected with an edge of the container and having at an end opposite the hinge a slit adapted for receiving the handle of the cleaning equipment therethrough.

11. The pair of handles for a cleaning bucket according to claim 1 wherein each handle is identical.

12. The pair of handles for a cleaning bucket according to claim 1 wherein a space defined between said handles when in the raised position has a trapezoidal configuration.

* * * * *